(12) United States Patent
Tomioka

(10) Patent No.: US 10,994,367 B2
(45) Date of Patent: May 4, 2021

(54) FRICTION STIR WELDING EQUIPMENT

(71) Applicant: Kabushiki Kaisha Toshiba, Minato-ku (JP)

(72) Inventor: Taizo Tomioka, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 406 days.

(21) Appl. No.: 16/013,483

(22) Filed: Jun. 20, 2018

(65) Prior Publication Data

US 2018/0297146 A1 Oct. 18, 2018

Related U.S. Application Data

(63) Continuation of application No. PCT/JP2017/021814, filed on Jun. 13, 2017.

(30) Foreign Application Priority Data

Aug. 10, 2016 (JP) ............................. JP2016-157425

(51) Int. Cl.
*B23K 20/12* (2006.01)
*B23K 20/233* (2006.01)
(Continued)

(52) U.S. Cl.
CPC ........ *B23K 20/1255* (2013.01); *B23K 20/125* (2013.01); *B23K 20/126* (2013.01);
(Continued)

(58) Field of Classification Search
CPC ................ B23K 20/125; B23K 20/126; B23K 20/1265; B23K 20/2333; B23K 20/1245;
(Continued)

(56) References Cited

U.S. PATENT DOCUMENTS

| | | | |
|---|---|---|---|
| 2004/0074944 A1 | 4/2004 | Okamoto et al. | |
| 2006/0289608 A1* | 12/2006 | Steel | B23K 20/1255 228/101 |
| 2009/0120995 A1* | 5/2009 | Hallinan | B29C 66/836 228/2.3 |

FOREIGN PATENT DOCUMENTS

| | | |
|---|---|---|
| DE | 10 2006 045 523 A1 | 4/2008 |
| DE | 10 2009 024 758 A1 | 2/2010 |

(Continued)

OTHER PUBLICATIONS

International Search Report dated Aug. 22, 2017 in PCT/JP2017/021814, filed on Jun. 13, 2017 (with English Translation).

(Continued)

*Primary Examiner* — Erin B Saad
(74) *Attorney, Agent, or Firm* — Oblon, McClelland, Maier & Neustadt, L.L.P.

(57) ABSTRACT

A friction stir welding equipment according to an embodiment includes a spindle unit, a holder, and a moving part; the spindle unit is capable of rotating a tool; the holder is connectable to the tool via a radial bearing and is capable of holding at least one of a side surface of a processing member or a rim of an upper surface of the processing member; and the moving part is capable of changing relative positions of the tool and the holder with respect to the processing member.

11 Claims, 10 Drawing Sheets

(51) Int. Cl.
  *B23K 20/227* (2006.01)
  *B23K 103/14* (2006.01)
  *B23K 103/02* (2006.01)
  *B23K 103/12* (2006.01)
  *B23K 103/08* (2006.01)
  *B23K 103/10* (2006.01)

(52) U.S. Cl.
  CPC ........ *B23K 20/128* (2013.01); *B23K 20/1215* (2013.01); *B23K 20/227* (2013.01); *B23K 20/233* (2013.01); *B23K 20/2333* (2013.01); *B23K 20/2336* (2013.01); *B23K 2103/02* (2018.08); *B23K 2103/08* (2018.08); *B23K 2103/10* (2018.08); *B23K 2103/12* (2018.08); *B23K 2103/14* (2018.08); *B23K 2103/15* (2018.08)

(58) Field of Classification Search
  CPC .............. B23K 20/1255; B23K 20/227; B23K 2103/10; B23K 2103/14; B23K 2103/15; B23K 20/121; B23K 20/1215; B23K 20/122; B23K 20/123; B23K 20/127; B23K 20/128; B23K 20/1285; B23K 20/129; B23K 20/233; B23K 20/2336; B23K 20/24; B23K 2101/006; B23K 2101/18; B23K 2103/02; B23K 2103/04; B23K 2103/05; B23K 2103/08; B23K 2103/12; B23K 2103/16; B23K 2103/172; B23K 2103/18; B23K 2103/20; B23K 2103/24; B23K 2103/34; B23K 2103/42; B23K 26/352

See application file for complete search history.

(56) References Cited

FOREIGN PATENT DOCUMENTS

| | | |
|---|---|---|
| DE | 10 2011 055 219 A1 | 8/2012 |
| DE | 10 2012 206 368 A1 | 10/2012 |
| JP | 11-226758 | 8/1999 |
| JP | 11-226758 A | 8/1999 |
| JP | 2002-120076 A | 4/2002 |
| JP | 2002-239754 | 8/2002 |
| JP | 2004-136331 | 5/2004 |
| JP | 2006-116566 | 5/2006 |
| JP | 2007-125598 A | 5/2007 |
| JP | 2007-319907 A | 12/2007 |
| JP | 4630172 | 2/2011 |
| JP | 2011-61245 | 3/2011 |
| JP | 2011-61245 A | 3/2011 |
| JP | 4672434 | 4/2011 |
| JP | 2015-47650 | 3/2015 |
| JP | 2015-47650 A | 3/2015 |

OTHER PUBLICATIONS

Written Opinion dated Aug. 22, 2017 in PCT/JP2017/021814, filed on Jun. 13, 2017.

* cited by examiner

US 10,994,367 B2

FRICTION STIR WELDING EQUIPMENT

CROSS-REFERENCE TO RELATED APPLICATIONS

This is a continuation application of International Application PCT/JP2017/021814, filed on Jun. 13, 2017. This application also claims priority to Japanese Patent Application No. 2016-157425, filed on Aug. 10, 2016. The entire contents of which are incorporated herein by reference.

FIELD

Embodiments of the invention relate to a friction stir welding equipment.

BACKGROUND

In friction stir welding (FSW; Friction Stir Welding), plastic flow of the material of a member (a main material) to be joined is caused by the pressure and the angular moment of a rotating tool.

For example, in the case where friction stir welding of overlaid members is performed, the rotating tool is inserted into the member on the upper side; and plastic flow of mainly the material of the member on the upper side is caused. At this time, there are cases where the rotational force of the tool is transferred to the member on the upper side; and the member on the upper side rotates or deforms. In the case where the position of the member on the upper side shifts, there is a risk that the joining position may shift; or the external appearance quality of the product may be lost.

Therefore, technology has been proposed in which the rotating tool is inserted into the member on the upper side in a state of being pressed onto the upper surface of the member on the upper side.

However, in the case where the force that presses onto the upper surface of the member on the upper side is weak, a new problem occurs in that the member on the upper side shifts in the rotation direction. In such a case, if the force that presses onto the upper surface of the member on the upper side is increased, there is a risk that damage to the upper surface of the member on the upper side, etc., may occur.

Also, the friction stir welding to date has been used to join relatively large parts used in automobiles, aircraft, etc.; therefore, normally, the joining position where the tool is inserted has been confirmed by the naked eye. However, to use for joining with higher quality, joining using a tool having a small diameter, etc., it is becoming more necessary to mount, to the friction stir welding equipment, an imaging unit such as a camera, etc., that images the joining position. In such a case, it is favorable for the distance (the offset amount) between the imaging unit and the tool to be determined easily.

Further, in friction stir welding, there are many cases where defects are prevented by slightly inserting the shoulder of the tool into the member to be joined to ensure the frictional heat amount and to apply pressure to the joining part. In such a case, it is favorable to be able to easily measure the distance between the shoulder of the tool and the upper surface of the member to be joined.

Therefore, the development of a friction stir welding equipment, a processing-position setting system, and a measurement system in which the productivity can be increased is desirable.

DETAILED DESCRIPTION

Figure 1:
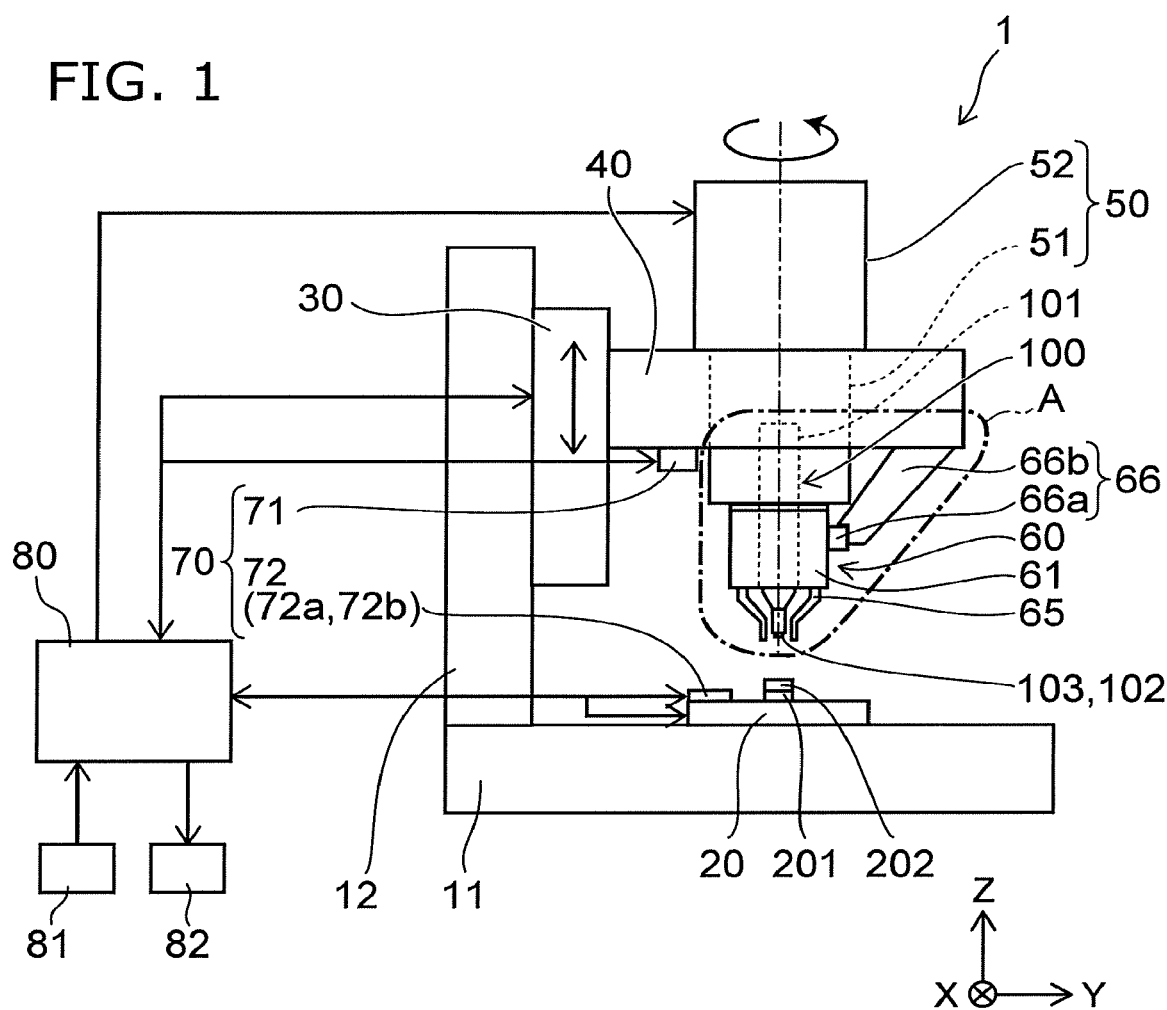
FIG. 1 is a schematic view for illustrating a friction stir welding equipment.

A friction stir welding equipment according to an embodiment includes a spindle unit, a holder, and a moving part; the spindle unit is capable of rotating a tool; the holder is connectable to the tool via a radial bearing and is capable of holding at least one of a side surface of a processing member or a rim of an upper surface of the processing member; and the moving part is capable of changing relative positions of the tool and the holder with respect to the processing member.

Embodiments will now be illustrated with reference to the drawings. Similar components in the drawings are marked with the same reference numerals; and a detailed description is omitted as appropriate.

Arrows X, Y, and Z inside the drawings illustrate three directions orthogonal to each other. For example, arrow Z illustrates a vertical direction; and arrow X and arrow Y illustrate horizontal directions.

FIG. 1 is a schematic view for illustrating a friction stir welding equipment 1.

Figure 2:
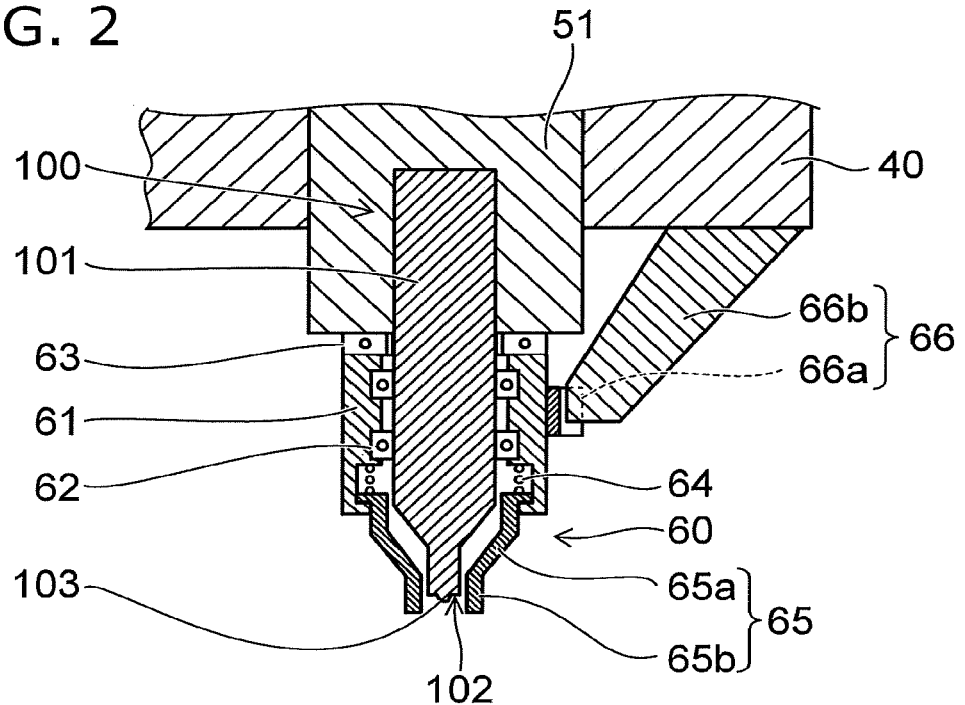
FIG. 2 is a schematic cross-sectional view of part A of FIG. 1.

FIG. 2 is a schematic cross-sectional view of part A of FIG. 1.

As shown in FIG. 1, a placement part 20, a raising/lowering part 30, a supporting part 40, a spindle unit 50, a holder 60, a processing-position setting system 70, and a controller 80 are provided in the friction stir welding equipment 1.

In the embodiment, the placement part 20 and the raising/lowering part 30 are used as moving parts that change the relative positions of a tool 100 and the holder 60 with respect to a processing member 202. Also, the placement part 20 is used as a moving part that changes the relative position of a touch panel 72 with respect to the tool 100 and an imaging unit 71.

The bed 11 can be mounted on a floor surface, etc.

For example, the post 12 can be provided on one surface of the bed 11. The post 12 extends in a Z-direction from the one surface of the bed 11.

The placement part 20 can be provided on the one surface of the bed 11. A processing member 201 is placed on the surface of the placement part 20 on the side opposite to the bed 11 side. Also, in the case illustrated in FIG. 1, the processing member 202 is placed on the processing member 201. A mechanism that holds the processing member 201 placed on the placement part 20 can be provided in the placement part 20. For example, a mechanical chuck can be provided in the placement part 20.

The materials of the processing members 201 and 202 are not particularly limited as long as plastic flow can be caused by friction stir welding. For example, the materials of the processing members 201 and 202 can be metals. The metals can be, for example, aluminum, an aluminum alloy, copper, a copper alloy, titanium, a titanium alloy, magnesium, a magnesium alloy, iron, etc.

The configurations of the processing members 201 and 202 are not particularly limited. For example, the processing members 201 and 202 can have plate configurations such as those illustrated in FIG. 1; and the processing members 201 and 202 can have block configurations. In the case illustrated in FIG. 1, the dimensions in the XY-direction of the processing member 202 are the same as the dimensions in the XY-direction of the processing member 201. However, the dimensions in the XY-direction of the processing member 202 may be shorter or longer than the dimensions in the XY-direction of the processing member 201.

Also, the planar configurations of the processing members 201 and 202 can be polygons. Hereinbelow, the case where the planar configurations of the processing members 201 and 202 are quadrilaterals is illustrated (referring to FIG. 3B and FIG. 4B).

The placement part 20 can be movable in the X-direction and the Y-direction. Therefore, the placement part 20 can move, in at least one direction of the X-direction or the Y-direction, the processing members 201 and 202 placed on the placement part 20. The placement part 20 can be, for example, an XY table including a servo motor or the like, etc.

The raising/lowering part 30 moves the tool 100 in the Z-direction via the supporting part 40. The raising/lowering part 30 can be provided at the post 12. The raising/lowering part 30 can be movable in the Z-direction. The raising/lowering part 30 can be, for example, a single-axis robot including a servo motor, a ball screw, or the like, etc.

The supporting part 40 is provided at the raising/lowering part 30. The supporting part 40 extends in the Y-direction from the raising/lowering part 30. The supporting part 40 is moved in the Z-direction by the raising/lowering part 30.

The spindle unit 50 (main spindle unit) rotates the tool 100. The spindle unit 50 includes a spindle 51 and a rotational drive motor 52.

The spindle 51 is provided in the supporting part 40 via a not-illustrated radial bearing. In other words, the spindle 51 is provided rotatably in the supporting part 40. The tool 100 is provided detachably at the tip of the spindle 51. For example, a shank 101 of the tool 100 can be inserted into a hole provided in the tip of the spindle 51, and the shank 101 can be fixed using a screw, etc.; or a holder such as a collet chuck, etc., can be provided at the tip of the spindle 51, and the shank 101 of the tool 100 can be held by the holder.

The tool 100 includes a shank 101, a shoulder 102, and a probe pin 103. The shank 101, the shoulder 102, and the probe pin 103 are formed as one body. The shank 101, the shoulder 102, and the probe pin 103 are provided to be concentric. However, there may be decentering that is about the magnitude of the manufacturing fluctuation.

Although the materials of the shank 101, the shoulder 102, and the probe pin 103 are not particularly limited, it is favorable for the materials to be harder than the materials of the processing members 201 and 202. The materials of the shank 101, the shoulder 102, and the probe pin 103 can be, for example, tool steel, a tungsten alloy, a ceramic, etc.

The shank 101 has a columnar configuration. The shank 101 can be a straight shank that has a circular columnar configuration.

Although the configuration of the shoulder 102 is not particularly limited, considering the anti-wear property, the manufacturability, etc., it is desirable to use a circular columnar configuration.

The probe pin 103 has a columnar configuration. The probe pin 103 has a circular columnar configuration or has a truncated circular conical configuration in which the outer width dimension (the cross-sectional width dimension) gradually decreases toward the tip. If the probe pin 103 that has a truncated circular conical configuration is used, the load when inserting the probe pin 103 into the processing member 201 can be reduced. A groove that has a spiral configuration can be provided in the side surface of the probe pin 103; or the side surface of the probe pin 103 can be a smooth curved surface.

The rotational drive motor 52 rotates the tool 100 via the spindle 51. The rotational drive motor 52 is provided at the supporting part 40. The rotational drive motor 52 is connected via a not-illustrated coupling, etc., to the end part of the spindle 51 on the side opposite to the side where the tool 100 is mounted. The rotational drive motor 52 can be, for example, an inverter-driven three-phase motor, etc.

As shown in FIG. 2, a housing 61, a radial bearing 62, a thrust bearing 63, an urging part 64, a pressing part 65, and a rotation stopper 66 are included in the holder 60.

The housing 61 has a tubular configuration. The shank 101 is inserted through the housing 61. For example, the housing 61 can be formed from a metal such as stainless steel, tool steel, etc.

The radial bearing 62 is provided between the tool 100 (the shank 101) and the interior wall of the housing 61. The radial bearing 62 is provided so that the rotational force of the tool 100 is transferred neither to the housing 61 nor to the pressing part 65. The radial bearing 62 can be, for example, a radial ball bearing, etc.

The thrust bearing 63 is provided between the end surface of the housing 61 and the end surface of the spindle 51. The thrust bearing 63 is provided so that the rotational force of the spindle 51 is transferred neither to the housing 61 nor to the pressing part 65. The thrust bearing 63 can be, for example, a thrust ball bearing, etc.

The urging part 64 is provided in the interior of the housing 61 at the vicinity of the end surface on the side opposite to the side where the thrust bearing 63 is provided. The urging part 64 urges a base part 65a toward the processing member 202 side. In other words, the urging part 64 urges the pressing part 65 in a direction to protrude from the housing 61. The urging part 64 can be, for example, a compression coil spring, etc.

The pressing part 65 includes the base part 65a and claws 65b.

The base part 65a has a tubular configuration. One end part of the base part 65a is provided in the interior of the housing 61 at the vicinity of the end surface on the side opposite to the side where the thrust bearing 63 is provided. The base part 65a is provided movably through the interior of the housing 61 in the axial direction.

The end parts of the multiple claws 65b on the side opposite to the processing member 202 side are provided at the base part 65a. In other words, the claws 65b are provided at the end surface of the base part 65a on the side opposite to the housing 61 side. The claws 65b protrude from the base part 65a. The claws 65b are multiply provided. The multiple claws 65b contact at least one of the side surface of the processing member 202 or the rim of the upper surface of the processing member 202. In other words, the pressing part 65 presses the at least one of the side surface of the processing member 202 or the rim of the upper surface of the processing member 202. Details relating to the operations of the pressing part 65 are described below.

The base part 65a and the claws 65b can be formed as one body. It is favorable for the base part 65a and the claws 65b to be formed from a material that is harder than the material of the processing member 202. For example, the base part 65a and the claws 65b can be formed from tool steel, etc.

The rotation stopper 66 is provided so that neither the position in the rotation direction of the housing 61 nor the positions in the rotation direction of the multiple claws 65b shift.

The rotation stopper 66 includes a guide 66a and a supporting part 66b. The guide 66a is provided at the outer surface of the housing 61. The guide 66a has a groove part.

One end part of the supporting part 66b is provided in the interior of the groove part of the guide 66a. The other end part of the supporting part 66b is provided at the supporting part 40. Therefore, the shift of the position in the rotation direction of the housing 61 (the positions in the rotation direction of the multiple claws 65b) can be suppressed. The supporting part 66b may be a plate-like body or a rod-like body.

The radial bearing 62, the thrust bearing 63, and the rotation stopper 66 can be omitted by providing the housing 61 in the supporting part 40. However, by mounting the housing 61 to the tool 100 (the shank 101) via the radial bearing 62, not only the alignment between the tool 100 (the probe pin 103) and the housing 61 but also the alignment between the tool 100 (the probe pin 103) and the multiple claws 65b can be easy.

As shown in FIG. 1, the imaging unit 71 and the touch panel 72 are provided in the processing-position setting system 70.

The imaging unit 71 is provided to be movable together with the tool 100 mounted to the spindle 51. In other words, the imaging unit 71 moves together with the tool 100. For example, the imaging unit 71 can be provided in the supporting part 40. In such a case, the imaging unit 71 is provided at a position where the processing member 202 placed on the placement part 20 is imageable. The imaging unit 71 can be, for example, a digital camera with CMOS image sensor, etc. The imaging unit 71 images the processing member 202. The imaging unit 71 images a mark 72a1 displayed at the touch panel 72.

The tip of the tool 100, i.e., the probe pin 103, contacts the touch panel 72.

The touch panel 72 is provided at the upper surface of the placement part 20 or the periphery of the placement part 20.

In the case illustrated in FIG. 1, the touch panel 72 is provided at the upper surface of the placement part 20. In such a case, the touch panel 72 is provided at a position where the imaging by the imaging unit 71 is possible. The touch panel 72 includes a displayer 72a such as a liquid crystal panel, etc., and a position input part 72b such as a touchpad, etc. Details relating to the operations of the processing-position setting system 70 are described below.

The controller 80 is electrically connected to the placement part 20, the raising/lowering part 30, the rotational drive motor 52, the imaging unit 71, and the touch panel 72. The controller 80 controls the operations of the components provided in the friction stir welding equipment 1. The controller 80 can be, for example, a computer including a CPU (central processing unit) and a memory device, etc.

Also, an input part 81 and a displayer 82 can be electrically connected to the controller 80. The operator inputs processing information (the design position of the joint), etc., to the controller 80 from the input part 81. The input part 81 can be, for example, a keyboard, etc. The displayer 82 displays the processing information (the design position of the joint) input from the input part 81, the progress state of the processing, etc. The displayer 82 can be, for example, a liquid crystal display device, etc.

For example, the controller 80 controls the rotational drive motor 52 and causes the tool 100 to rotate. Also, the controller 80 controls the placement part 20 and the raising/lowering part 30 and changes the relative position of the tool 100 and the processing member 202. For example, the controller 80 controls the placement part 20 so that the processing position (the joining position) of the processing member 202 is below the tool 100 (the probe pin 103). Then, the controller 80 controls the raising/lowering part 30 so that the probe pin 103 is inserted into the interior of the processing member 202 or so that the probe pin 103 is extracted from the processing member 202. Known technology is applicable to the friction stir welding using the tool 100; and a detailed description is therefore omitted.

Also, the controller 80 causes the display of the mark 72a1 at the position where the tip of the tool 100 contacted the touch panel 72. The distance (the offset amount) between the imaging unit 71 and the tool 100 (the probe pin 103) and the processing position of the processing member 202 are determined based on the information from the imaging unit 71, the placement part 20, etc.

In the friction stir welding equipment 1 illustrated above, the positions in the Z-direction of the tool 100 and the holder are changed by the raising/lowering part 30; and the positions in the X-direction and the Y-direction of the processing members 201 and 202 are changed by the placement part 20. However, it is sufficient to be able to change the relative three-dimensional positions between the tool 100, the holder 60, and the processing members 201 and 202. For example, the spindle unit 50 to which the tool 100 and the holder 60 are mounted may be provided in the hand of a six-axis vertical articulated robot, etc.; and the processing members 201 and 202 may be placed on a pedestal, etc.

Operations of the pressing part 65 will now be described further.

When the supporting part 40 is lowered by the raising/lowering part 30, the claws 65b of the pressing part 65 are pressed onto the processing member 202. The pressing force at this time is applied by the urging part 64. Then, when the supporting part 40 is lowered further by the raising/lowering part 30, the probe pin 103 of the rotating tool 100 is inserted into the processing member 202. When the probe pin 103 of the rotating tool 100 is inserted into the processing member 202, plastic flow of the material of the processing member 202 occurs; and the processing member 201 and the processing member 202 are joined.

Here, there is a risk that the position of the processing member 202 may shift when the rotational force of the tool 100 is transferred to the processing member 202 when inserting the probe pin 103 into the processing member 202. In such a case, it also may be considered to insert the probe pin 103 of the rotating tool 100 into the processing member 202 in a state in which the upper surface of the processing member 202 is pressed by a pressing member. However, in the case where the force of pressing the upper surface of the processing member 202 is weak, there is a risk that slipping may occur between the pressing member and the processing member 202; and the processing member 202 may shift in the rotation direction. In such a case, if the force of pressing the upper surface of the processing member 202 is increased, there is a risk that damage to the upper surface of the processing member 202, etc., may occur.

Therefore, in the friction stir welding equipment 1 according to the embodiment, at least one of the side surface of the processing member 202 or the rim of the upper surface of the processing member 202 is held by the multiple claws 65b.

Figure 3A:
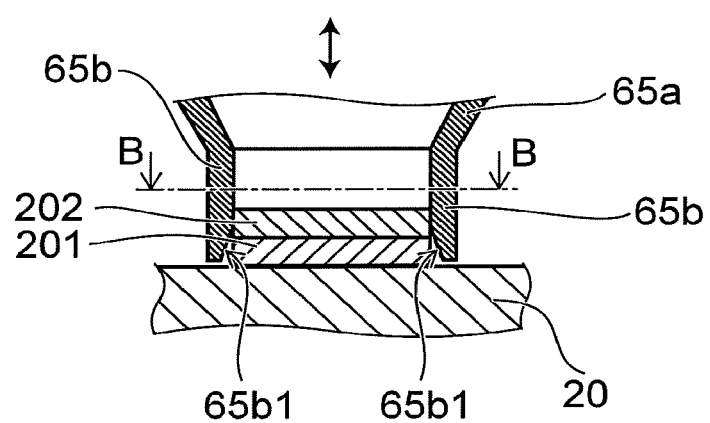
FIGS. 3A and 3B are schematic views for illustrating the case where the side surface of the processing member is held by multiple claws.
Figure 3B:
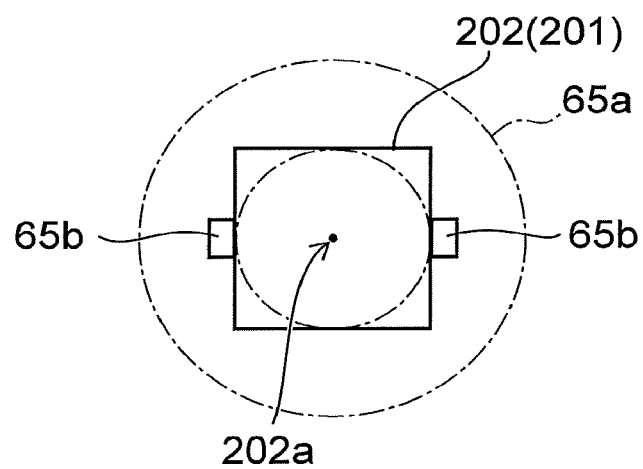

FIGS. 3A and 3B are schematic views for illustrating the case where the side surface of the processing member 202 is held by the multiple claws 65b.

FIG. 3B is a line B-B cross-sectional view of FIG. 3A.

Figure 4A:
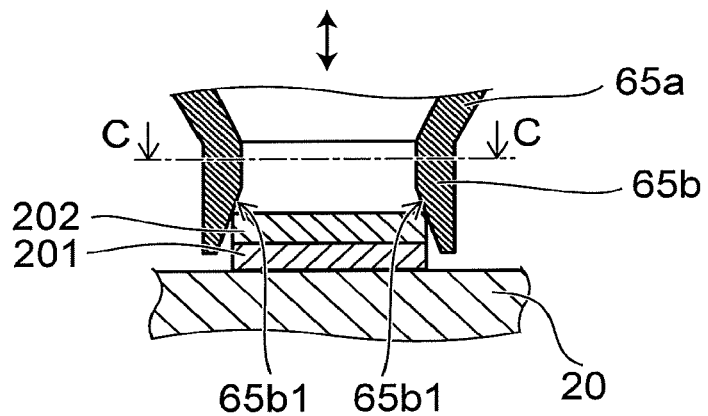
FIGS. 4A and 4B are schematic views for illustrating the case where the rim of the upper surface of the processing member is held by the multiple claws.
Figure 4B:
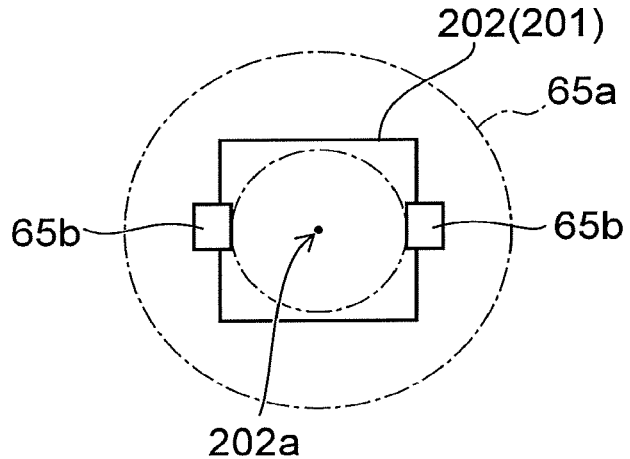

FIGS. 4A and 4B are schematic views for illustrating the case where the rim of the upper surface of the processing member 202 is held by the multiple claws 65b.

FIG. 4B is a line C-C cross-sectional view of FIG. 4A.

Also, although a drawing is not illustrated, a part of the multiple claws 65b may contact the side surface of the processing member 202; and another part of the multiple claws 65b may contact the rim of the upper surface of the processing member 202.

Thus, even in the case where an angular moment is produced in the processing member 202 by the rotational force of the tool 100, the shift of the position of the processing member 202 can be suppressed.

The force of pressing the multiple claws 65b onto the processing member 202 is applied by the urging part 64.

Also, the rotational force of the tool 100 is not directly applied to the processing member 201. Also, the processing member 201 is sandwiched between the processing member 202 and the placement part 20. Therefore, compared to the processing member 202, the shift of the position of the processing member 201 does not occur easily; therefore, the contact between the processing member 201 and the multiple claws 65b is not always necessary.

Also, as shown in FIG. 3A and FIG. 4A, it is favorable for tilted surfaces 65b1 to be provided at the tip vicinities of the multiple claws 65b. The tilted surfaces 65b1 are tilted in a direction approaching the center of the pressing part 65 from the tips of the claws 65b toward the base part 65a side. By providing the tilted surfaces 65b1, the processing member 202 can be guided; therefore, the position of the processing member 202 can be corrected. Also, by providing the tilted surfaces 65b1, it is easy for the multiple claws 65b to contact the rim of the upper surface of the processing member 202.

Also, when viewed in plan, it is favorable for the multiple claws 65b to be provided to sandwich a centroid 202a of the processing member 202. For example, as shown in FIG. 3B and FIG. 4B, when viewed in plan, two claws 65b can be provided to sandwich the centroid 202a of the processing member 202. Thus, the shift of the position of the processing member 202 due to the rotational force of the tool 100 can be suppressed effectively. However, the number of the claws 65b is not limited to two. For example, the claws 65b can be provided on each side of the processing member 202.

Also, because a space is provided between the tab 65b and the tab 65b, the debris when processing the processing member 202 can be discharged. Therefore, soiling of the upper surface of the processing member 202 can be suppressed.

Operations of the processing-position setting system 70 will now be described further.

First, the processing-position setting system 70 determines the distance (the offset amount) between the imaging unit 71 and the tool 100 (the probe pin 103).

Figure 5A:
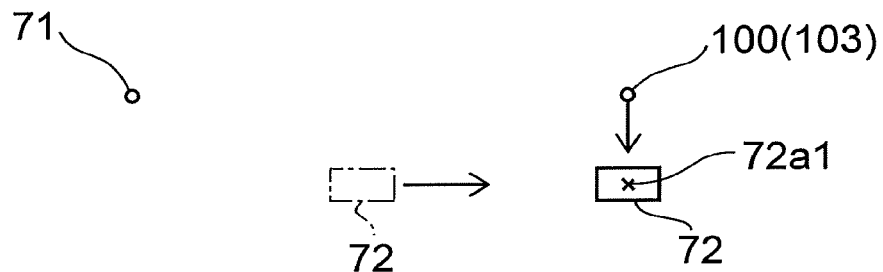
FIGS. 5A and 5B are schematic views for illustrating the calculation of the offset amount in the Y-direction.
Figure 5B:
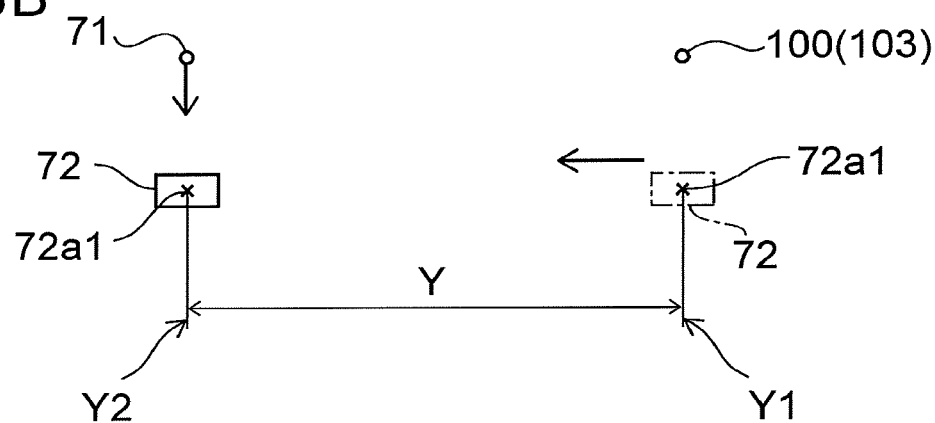

FIGS. 5A and 5B are schematic views for illustrating the calculation of the offset amount in the Y-direction.

First, as shown in FIG. 5A, the controller 80 controls the placement part 20 and causes the touch panel 72 to move to the tool 100 side.

Continuing, the probe pin 103 is caused to contact the touch panel 72 by the tool 100 being lowered by the raising/lowering part 30. The touch panel 72 detects the position contacted by the probe pin 103 by using a position input part such as a touchpad, etc. The position information that is detected by the position input part is transmitted to the controller 80. Based on the detected position information, the controller 80 causes the display of the prescribed mark 72a1 in a displayer such as a liquid crystal panel, etc., provided in the touch panel 72. The configuration, size, etc., of the mark 72a1 are not particularly limited; and it is sufficient for the imaging by the imaging unit 71 to be possible. For example, the mark 72a1 may be a single bright spot, etc.

Continuing as shown in FIG. 5B, the controller 80 controls the placement part 20 and causes the touch panel 72 where the mark 72a1 is displayed to move to the imaging unit 71 side.

When the mark 72a1 imaged by the imaging unit 71 reaches a prescribed position, the movement due to the placement part 20 is stopped. The movement distance between a start position Y1 and a stop position Y2 is used as an offset amount Y in the Y-direction. For example, an encoder that is used to control a servo motor is provided in the placement part 20. Therefore, the movement distance can be calculated from the output of the encoder provided in the placement part 20, etc.

In other words, the controller 80 controls the placement part 20 which is the moving part and causes the touch panel 72 where the mark 72a1 is displayed to move to the imaging unit 71 side. When the mark 72a1 imaged by the imaging unit 71 reaches the prescribed position, the controller 80 stops the movement of the touch panel 72. Based on the movement distance between the start position and the stop position of the touch panel 72, the controller 80 determines the distance between the tool 100 and the imaging unit 71.

Thus, the offset amount in the Y-direction can be determined. Also, the offset amount in the X-direction can be determined by a similar method.

Here, the offset amount also can be determined using a dummy workpiece by providing a damage mark in the dummy workpiece by the probe pin 103 and by imaging the damage mark. Also, the offset amount also can be determined using pressure-sensitive paper or the like by providing a mark in the pressure-sensitive paper by the probe pin 103 and by imaging the mark.

However, it is necessary to perform the detection of the offset amount each time the replacement of the tool 100 and/or the maintenance of the friction stir welding equipment 1 is performed. Therefore, resource conservation cannot be realized by using a consumable part such as a dummy workpiece, pressure-sensitive paper, etc. Also, there is a risk that the life of the probe pin 103 may become short if the dummy workpiece is used.

According to the processing-position setting system 70 according to the embodiment, the detection of the offset amount can be performed repeatedly without using a consumable part. Also, compared to the case where the dummy workpiece is used, a longer life of the probe pin 103 can be realized.

Then, the processing-position setting system 70 determines the processing position of the processing member 202.

First, the controller 80 controls the placement part 20 and causes the processing member 202 to move from a prescribed origin position to the imaging unit 71 side. In the case where a characteristic part of the processing member 202 (e.g., a corner of the processing member 202 or the like) is imaged by the imaging unit 71, the position information of the characteristic part of the processing member 202 (the distance from the origin position of the imaging unit 71 to the characteristic part) is transmitted to the controller 80. The distance from the origin position of the imaging unit 71 to the characteristic part can be calculated from the output of the encoder provided in the placement part 20, etc.

The controller 80 calculates the distance from the prescribed origin position of the tool 100 to the design position of the joint based on the detected position information, the processing information input from the input part 81 (the design position of the joint), and the determined distance (offset amount) between the imaging unit 71 and the tool 100 (the probe pin 103).

Figure 6:
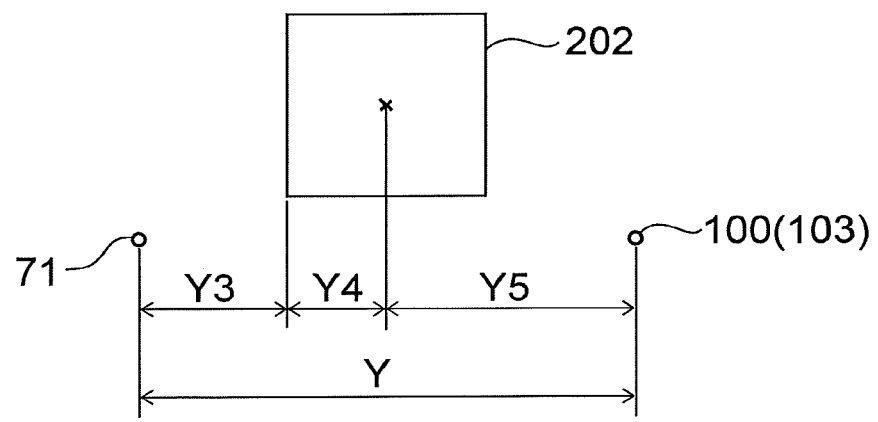
FIG. 6 is a schematic view for illustrating the calculation of the movement distance of the tool in the Y-direction.

FIG. 6 is a schematic view for illustrating the calculation of the movement distance of the tool 100 in the Y-direction. As shown in FIG. 6, a distance Y5 from the prescribed origin position of the tool 100 to the design position of the joint can be determined by the following formula, wherein the distance from the origin position of the imaging unit 71 to the characteristic part is Y3, the distance from the characteristic part to the design position of the joint is Y4, and the distance (the offset amount) between the imaging unit 71 and the tool 100 (the probe pin 103) is Y.

$$Y5=Y-Y3-Y4$$

The distance from the prescribed origin position of the tool 100 to the design position of the joint in the X-direction can be determined by a similar method.

The controller 80 sets, as the processing position, the distances from the prescribed origin position of the tool 100 to the design position of the joint in the X-direction and the Y-direction. In other words, the controller 80 sets the movement distance of the tool 100 in the X-direction and the Y-d direction.

Further, the distance from the prescribed origin position of the tool 100 to the upper surface of the touch panel 72 in the Z-direction can be determined when the probe pin 103 is caused to contact the touch panel 72 by the tool 100 being lowered by the raising/lowering part 30. Therefore, by premeasuring the distance between the upper surface of the placement part 20 and the upper surface of the touch panel 72, not only the distance to the upper surface of the placement part 20 but also the distance to the upper surface of the processing member 202 from the prescribed origin position of the tool 100 in the Z-direction can be determined.

In such a case, if the upper surface of the touch panel 72 and the upper surface of the processing member 202 are preset to be the same position (the same height), the distance from the prescribed origin position of the tool 100 to the upper surface of the processing member 202 in the Z-direction can be determined easily in the detection of the offset amount described above.

Also, although the case where the processing member 202 is stacked on the processing member 201 is illustrated above, the processing member 201 and the processing member 202 also can be provided to be arranged on the placement part 20.

Figure 7A:
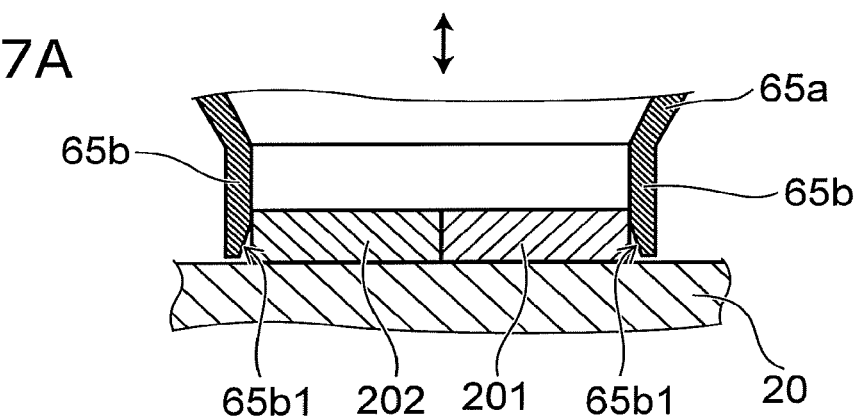
FIG. 7A is a schematic view for illustrating the case where the side surface of the processing member is held by the multiple claws.

FIG. 7A is a schematic view for illustrating the case where the side surfaces of the processing members 201 and 202 are held by the multiple claws 65b.

Figure 7B:
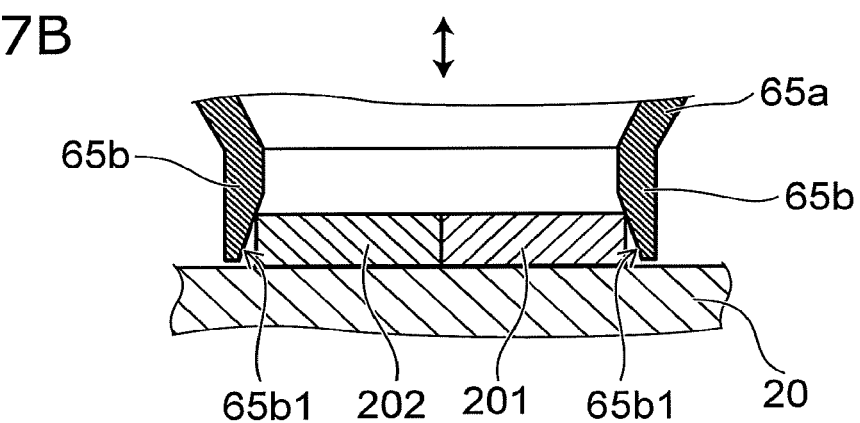
FIG. 7B is a schematic view for illustrating the case where the rim of the upper surface of the processing member is held by the multiple claws.

FIG. 7B is a schematic view for illustrating the case where the rims of the upper surfaces of the processing members 201 and 202 are held by the multiple claws 65b.

Thus, even in the case where an angular moment on the processing members 201 and 202 is produced by the rotational force of the tool 100, the shift of the positions of the processing members 201 and 202 can be suppressed.

The case where the processing-position setting system 70 is provided in the friction stir welding equipment 1 including the holder 60 is illustrated above. However, the processing-position setting system 70 also can be provided in a friction stir welding equipment 1a that does not include the holder 60.

Figure 8:
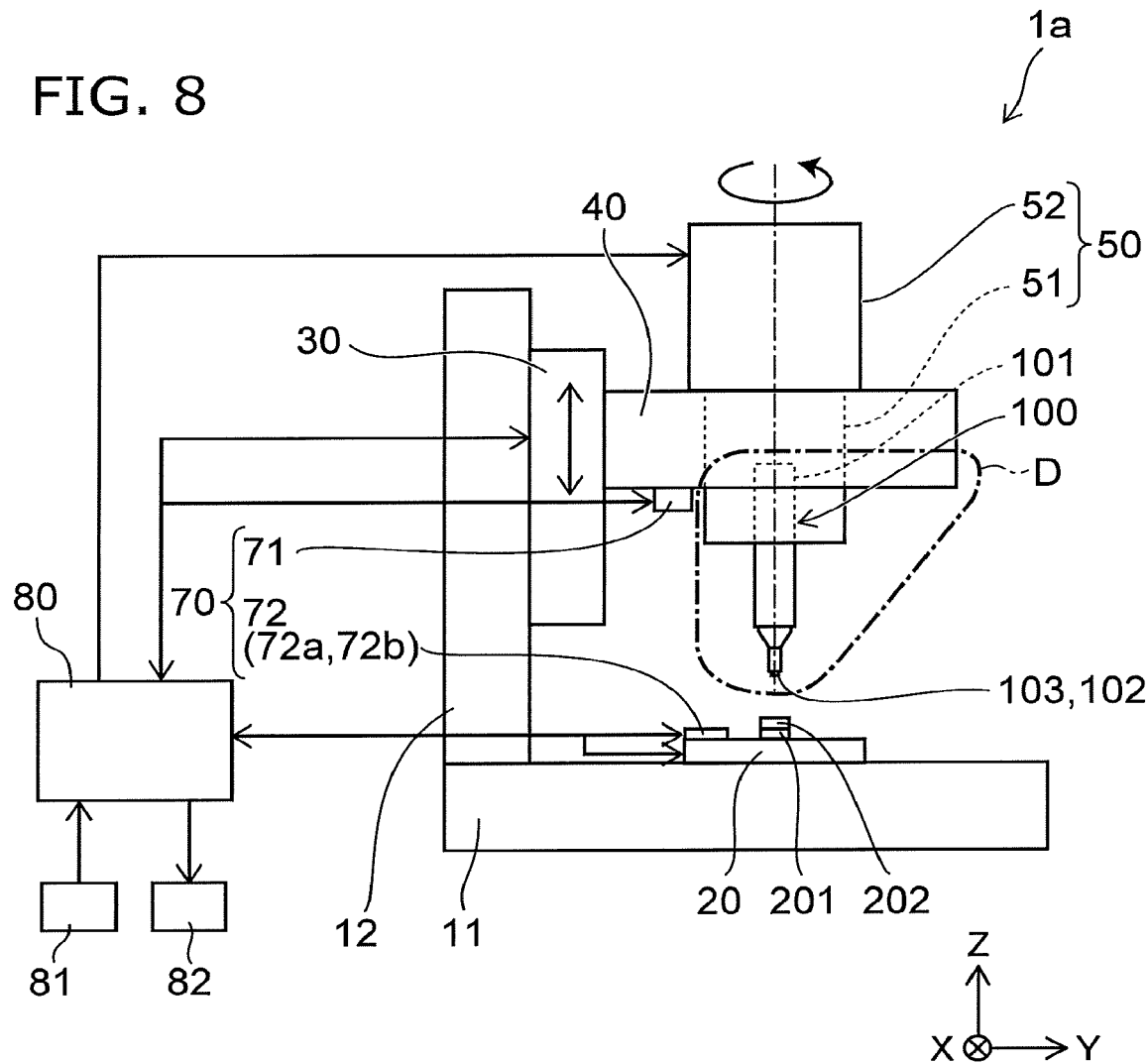
FIG. 8 is a schematic view for illustrating a friction stir welding equipment.

FIG. 8 is a schematic view for illustrating the friction stir welding equipment 1a.

Figure 9:
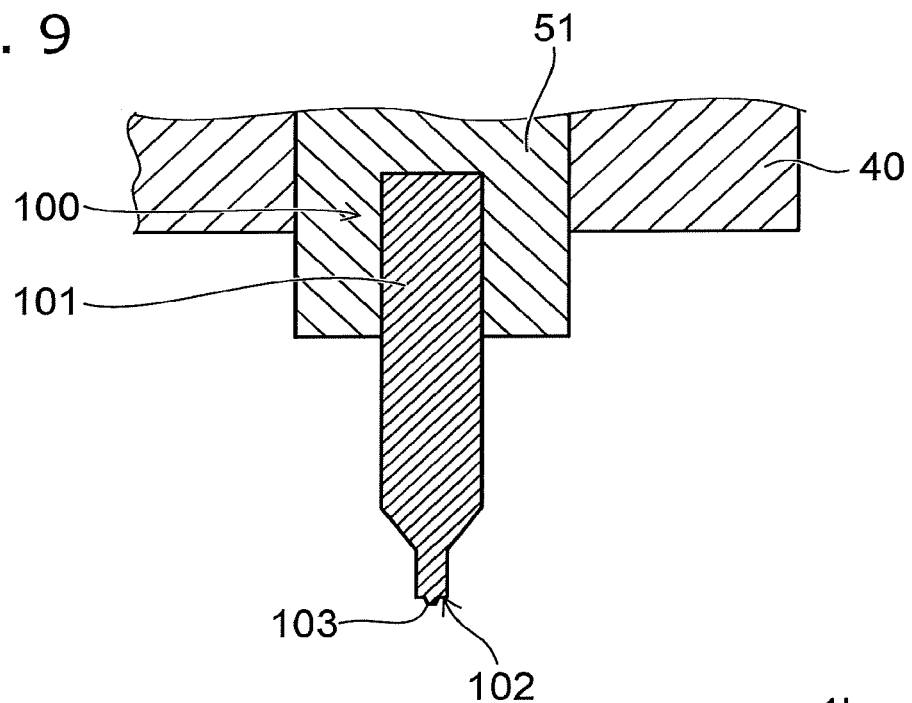
FIG. 9 is a schematic cross-sectional view of part D of FIG. 8.

FIG. 9 is a schematic cross-sectional view of part D of FIG. 8.

As shown in FIG. 8 and FIG. 9, the placement part 20, the raising/lowering part 30, the supporting part 40, the spindle unit 50, the processing-position setting system 70, and the controller 80 are provided in the friction stir welding equipment 1a. In other words, the friction stir welding equipment 1a does not include the holder 60.

Even in the case where the processing-position setting system 70 is provided in the friction stir welding equipment 1a not including the holder 60, the processing-position setting system 70 can realize the operations and effects described above.

For example, the processing-position setting system 70 can determine the distance (the offset amount) between the imaging unit 71 and the tool 100 (the probe pin 103). In such a case, the detection of the offset amount can be performed repeatedly without using a consumable part. Compared to the case where a dummy workpiece is used, a longer life of the probe pin 103 also can be realized.

The processing-position setting system 70 can determine the processing position of the processing member 202.

The processing-position setting system 70 can determine not only the distance to the upper surface of the placement part 20 but also the distance to the upper surface of the processing member 202 from the prescribed origin position of the tool 100 in the Z-direction.

The processing-position setting system 70 can be similar to that described above; and a detailed description is therefore omitted.

A processing-position setting system 70a according to another embodiment will now be illustrated.

Figure 10:
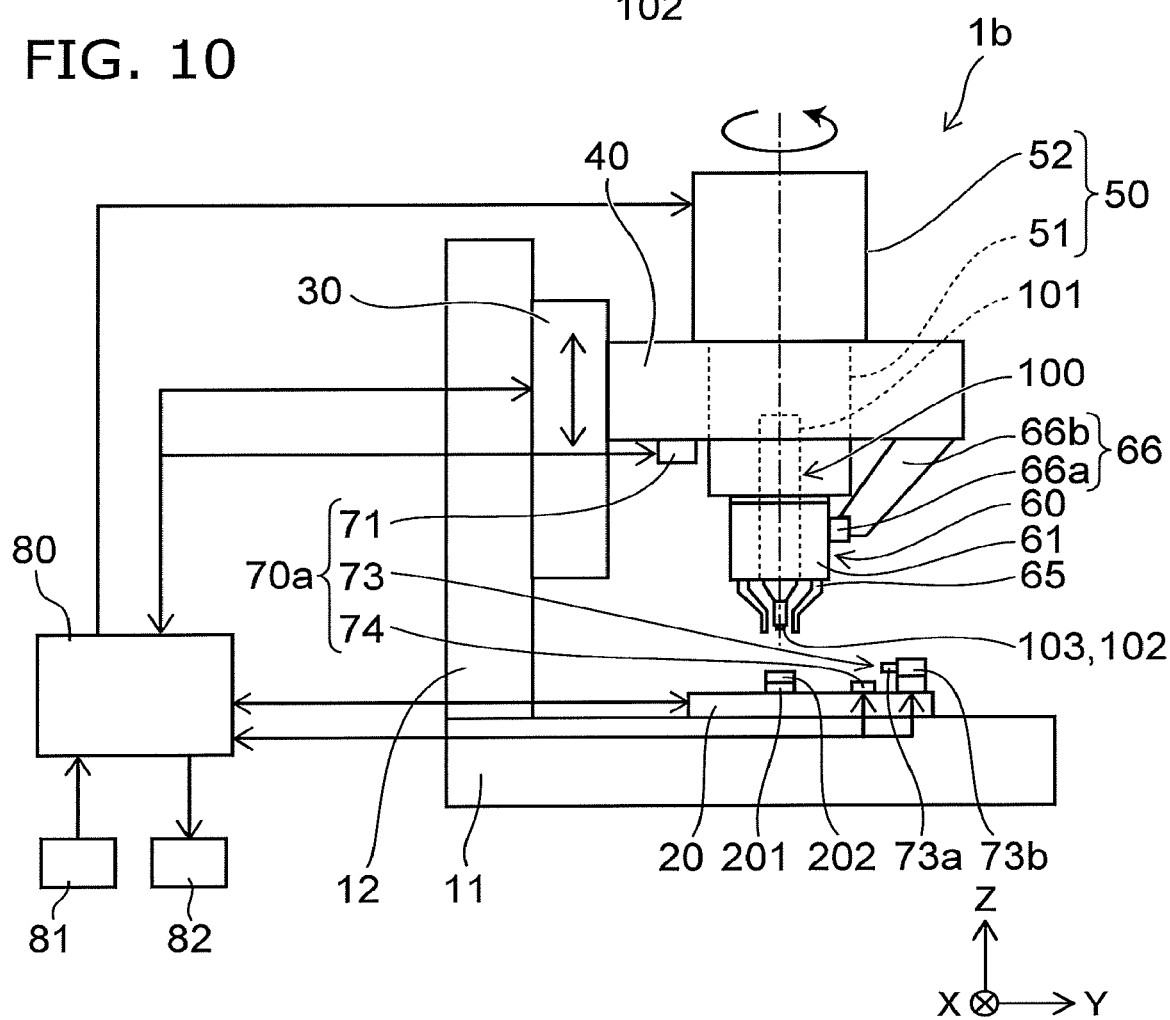
FIG. 10 is a schematic view for illustrating a friction stir welding equipment.

FIG. 10 is a schematic view for illustrating a friction stir welding equipment 1b.

As shown in FIG. 10, the placement part 20, the raising/lowering part 30, the supporting part 40, the spindle unit 50, the holder 60, the processing-position setting system 70a, and the controller 80 are provided in the friction stir welding equipment 1b.

In other words, the processing-position setting system 70*a* is provided in the friction stir welding equipment 1*b* instead of the processing-position setting system 70 described above.

The controller 80 is electrically connected to the placement part 20, the raising/lowering part 30, the rotational drive motor 52, the imaging unit 71 (corresponding to an example of the first imaging unit), a driving part 73*b*, and an imaging unit 74 (corresponding to an example of the second imaging unit). The controller 80 controls the operations of the components provided in the friction stir welding equipment 1*b*. The imaging unit 71 is provided at a position where the processing member is imageable. The imaging unit 74 is provided at a position where the end part of the tool 100 on the processing member side is imageable.

The imaging unit 71, a target 73, and the imaging unit 74 are provided in the processing-position setting system 70*a*.

The target 73 and the imaging unit 74 are movable with the processing member placed on the placement part 20. For example, the target 73 and the imaging unit 74 can be provided at the placement part 20.

The target 73 includes a movable alignment mark 73*a* and the driving part 73*b*.

The movable alignment mark 73*a* is used to align a prescribed position 71*a* of the imaging region of the imaging unit 71 (e.g., the center position of the imaging region) and a prescribed position 74*a* of the imaging region of the imaging unit 74 (e.g., the center position of the imaging region). The movable alignment mark 73*a* is disposable between the imaging unit 71 and the imaging unit 74.

The configuration of the movable alignment mark 73*a* is not particularly limited. The configuration of the movable alignment mark 73*a* can be, for example, a circular ring, a cross, etc. In such a case, if the configuration of the movable alignment mark 73*a* is a circular ring, it is easy to detect the center position of the movable alignment mark 73*a*, etc., imaged by the imaging units 71 and 74.

The driving part 73*b* holds the movable alignment mark 73*a* and changes the relative position between the movable alignment mark 73*a* and the imaging unit 74. For example, when aligning the prescribed position 71*a* of the imaging region of the imaging unit 71 and the prescribed position 74*a* of the imaging region of the imaging unit 74, the driving part 73*b* moves the movable alignment mark 73*a* to the imaging region of the imaging unit 74 (e.g., above the imaging unit 74). When the shoulder 102 of the tool 100 or the like is imaged by the imaging unit 74, the driving part 73*b* moves the movable alignment mark 73*a* outside the imaging region of the imaging unit 74.

The imaging unit 74 can be, for example, a CCD camera, etc.

Operations of the processing-position setting system 70*a* will now be described.

First, the processing-position setting system 70*a* determines the distance (the offset amount) between the imaging unit 71 and the tool 100 (the probe pin 103).

Figure 11A:
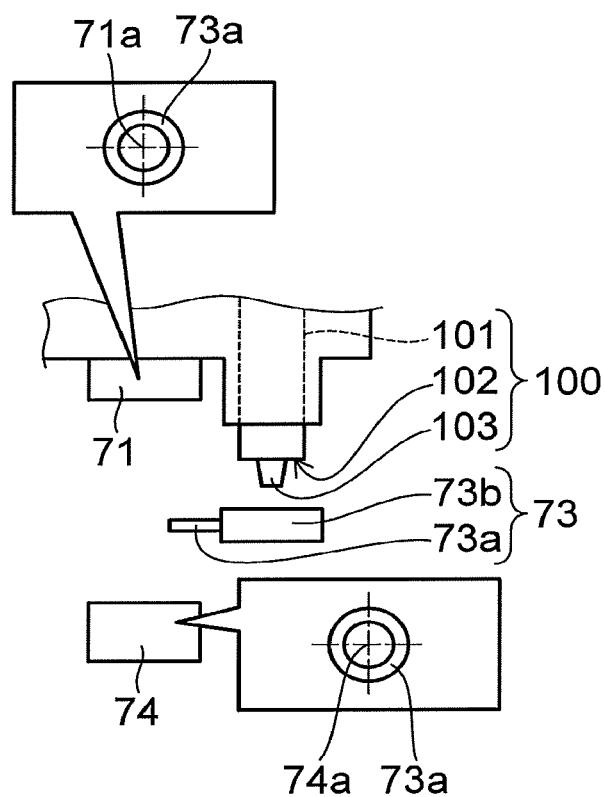
FIGS. 11A and 11B are schematic views for illustrating the calculation of the offset amount.
Figure 11B:
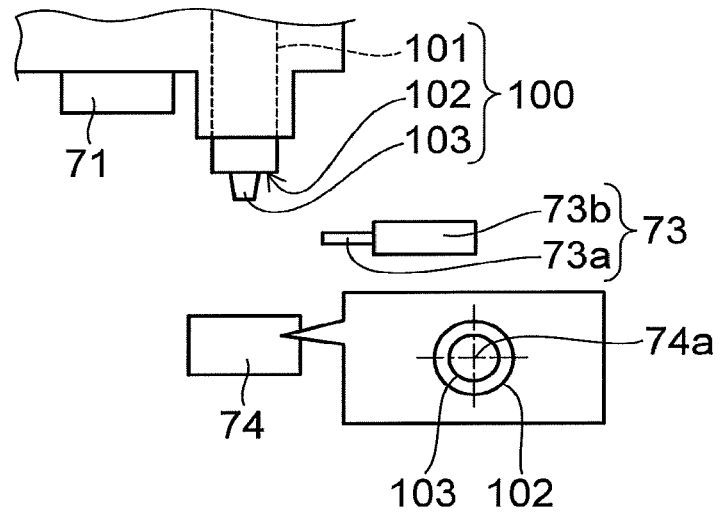

FIGS. 11A and 11B are schematic views for illustrating the calculation of the offset amount.

First, as shown in FIG. 11A, the controller 80 controls the placement part 20 and causes the target 73 and the imaging unit 74 to move to the imaging region of the imaging unit 71 (e.g., below the imaging unit 71). At this time, the driving part 73*b* moves the movable alignment mark 73*a* into the imaging region of the imaging unit 74. In such a case, the movable alignment mark 73*a* also moves into the imaging region of the imaging unit 71.

Continuing, the imaging unit 74 images the movable alignment mark 73*a*. The controller 80 aligns the prescribed position 74*a* of the imaging region of the imaging unit 74 and the prescribed position of the movable alignment mark 73*a*.

The imaging unit 71 images the movable alignment mark 73*a*. The controller 80 aligns the prescribed position 71*a* of the imaging region of the imaging unit 71 and the prescribed position of the movable alignment mark 73*a*.

For example, the controller 80 can align the prescribed positions 71*a* and 74*a* of the imaging region and the prescribed position of the movable alignment mark 73*a* by using a known image processing method.

The alignment between the prescribed position 74*a* of the imaging region of the imaging unit 74 and the prescribed position 71*a* of the imaging region of the imaging unit 71 can be performed by performing alignment with respect to the same movable alignment mark 73*a*.

Then, as shown in FIG. 11B, the controller 80 controls the placement part 20 and causes the target 73 and the imaging unit 74 to move below the tool 100. At this time, the driving part 73*b* moves the movable alignment mark 73*a* outside the imaging region of the imaging unit 74.

Continuing, the imaging unit 74 images the end surface of the probe pin 103. The controller 80 controls the placement part 20 and causes the position of the imaging unit 74 to move so that the prescribed position 74*a* of the imaging region of the imaging unit 74 and the prescribed position of the probe pin 103 (e.g., the center position of the probe pin 103) imaged by the imaging unit 74 align.

For example, the controller 80 can cause the position of the imaging unit 74 to move so that the prescribed position 74*a* of the imaging region of the imaging unit 74 and the prescribed position of the probe pin 103 imaged by the imaging unit 74 align by using a known image processing method.

Although the probe pin 103 is used as the object of the alignment, the shank 101, the shoulder 102, etc., may be used as the object of the alignment.

Because the alignment between the prescribed position 74*a* of the imaging region of the imaging unit 74 and the prescribed position 71*a* of the imaging region of the imaging unit 71 is performed, the movement distance of the imaging unit 74 is the distance (the offset amount) between the imaging unit 71 and the tool 100 (the probe pin 103). In such a case, the movement distance can be calculated from the output of the encoder provided in the placement part 20, etc.

According to the processing-position setting system 70*a* according to the embodiment, the detection of the offset amount can be performed repeatedly without using a consumable part. Also, compared to the case where a dummy workpiece is used, a longer life of the probe pin 103 can be realized.

Also, the processing-position setting system 70*a* can determine the processing position of the processing member 202.

The calculation of the processing position can be similar to that illustrated in FIG. 6. A detailed description is therefore omitted.

The case where the processing-position setting system 70*a* is provided in the friction stir welding equipment 1*b* including the holder 60 is illustrated above. However, the processing-position setting system 70*a* also can be provided in a friction stir welding equipment 1*c* not including the holder 60.

Figure 12:
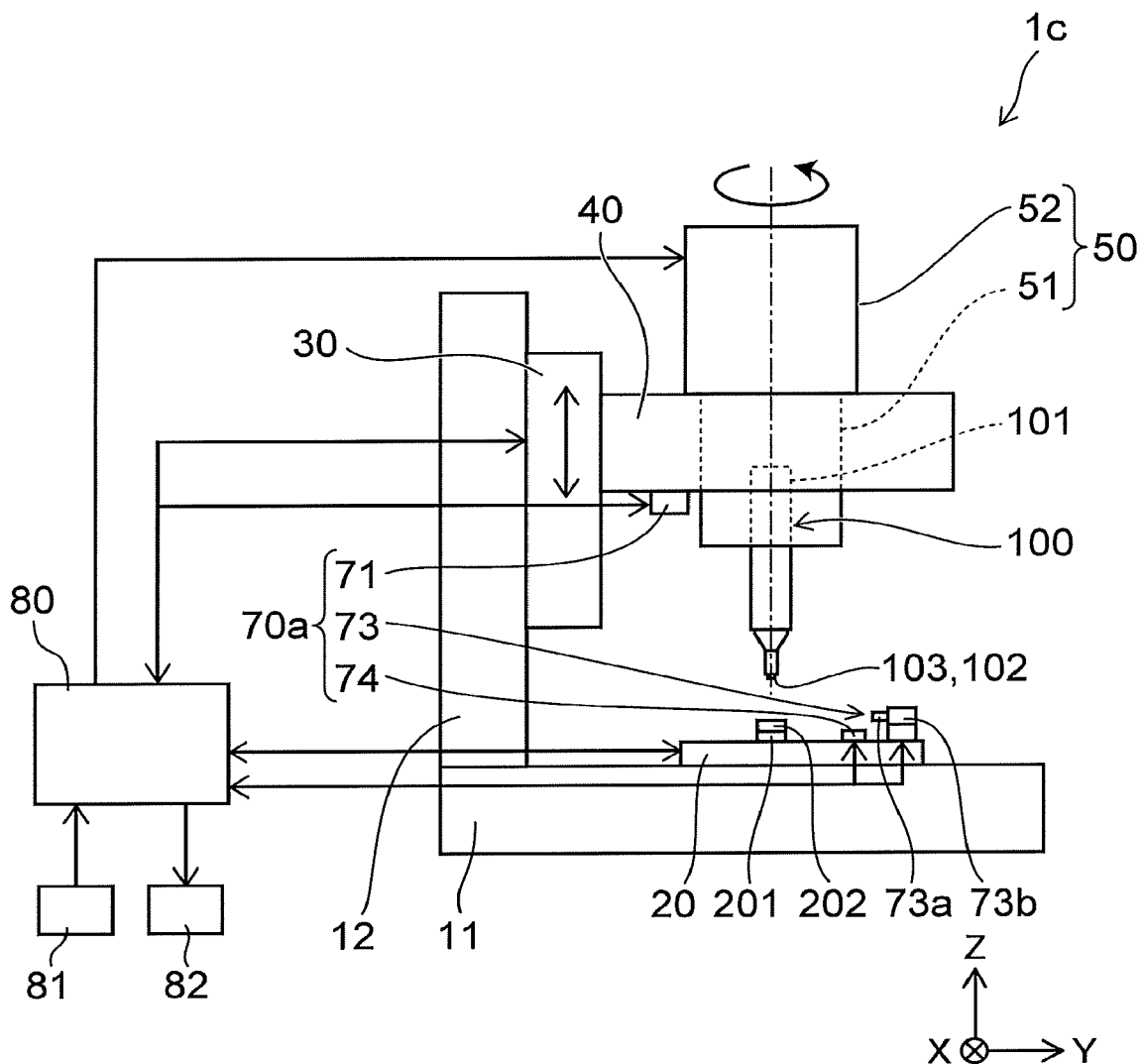
FIG. 12 is a schematic view for illustrating a friction stir welding equipment.

FIG. 12 is a schematic view for illustrating a friction stir welding equipment 1*c*.

As shown in FIG. 12, the placement part 20, the raising/lowering part 30, the supporting part 40, the spindle unit 50, the processing-position setting system 70a, and the controller 80 are provided in the friction stir welding equipment 1c. In other words, the friction stir welding equipment 1c does not include the holder 60.

Even in the case where the processing-position setting system 70a is provided in the friction stir welding equipment 1c not including the holder 60, the processing-position setting system 70a can realize the operations and effects described above.

For example, the processing-position setting system 70a can determine the distance (the offset amount) between the imaging unit 71 and the tool 100 (the probe pin 103). In such a case, the detection of the offset amount can be performed repeatedly without using a consumable part. Compared to the case where a dummy workpiece is used, a longer life of the probe pin 103 also can be realized.

The processing-position setting system 70a can determine the processing position of the processing member 202.

The processing-position setting system 70a can be similar to that described above; and a detailed description is therefore omitted.

Also, although the processing-position setting systems 70 and 70a that are provided in a friction stir welding equipment are illustrated above, the processing-position setting systems 70 and 70a are applicable to a device that determines the processing position by using image processing. The device that determines the processing position by using image processing can be, for example, a manufacturing apparatus of an electronic component such as a wire bonder, a die bonder, a chip mounter, an inserter, etc. In other words, in these devices as well, the distance (the offset amount) between the imaging unit and the tool, the processing position of the member, the movement distance of the tool, etc., can be determined by the processing-position setting systems 70 and 70a according to the embodiment.

For example, the processing-position setting system 70 can include the imaging unit 71, the touch panel 72, a moving part, and a controller.

The tip of a tool that contacts a workpiece contacts the touch panel 72. The workpiece is, for example, a semiconductor chip, a capacitor chip, a semiconductor device, etc. The tool is, for example, a bonding tool, a suction tool, a chuck, etc.

The controller is electrically connected to the touch panel 72. The controller causes the display of the mark 72a1 at the position where the tip of the tool contacted the touch panel 72.

The imaging unit 71 images the mark 72a1 displayed at the touch panel 72.

The moving part changes the relative position of the touch panel 72 with respect to the tool and the imaging unit 71. The moving part can be, for example, an XY table including a servo motor, etc.

The controller controls the moving part and causes the touch panel 72 where the mark 72a1 is displayed to move to the imaging unit 71 side. When the mark 72a1 imaged by the imaging unit 71 reaches the prescribed position, the controller stops the movement of the touch panel 72. Based on the movement distance between the start position and the stop position of the touch panel 72, the controller determines the distance (the offset amount) between the tool and the imaging unit 71.

In other words, the processing-position setting system 70 can be operated similarly to the case illustrated in FIGS. 5A and 5B and FIG. 6.

Also, the processing-position setting system 70a also can be provided instead of the processing-position setting system 70. In such a case, the processing-position setting system 70a can include the imaging unit 71 that is capable of imaging the workpiece, the imaging unit 74 that is capable of imaging the end part of the tool on the workpiece side, the movable alignment mark 73a that is disposable between the imaging unit 71 and the imaging unit 74, and the driving part 73b.

Also, the processing-position setting system 70a can be operated similarly to the case illustrated in FIGS. 11A and 11B.

As described above, the processing-position setting system 70 can determine the distance between the upper surface of the processing member 202 and the tip of the probe pin 103 in the Z-direction.

Here, if the end surface of the shoulder 102 is not inserted into the interior of the processing member 202 in the friction stir welding, it is difficult to ensure the necessary frictional heat. Also, there is a risk that defects may occur due to the flowing material flowing outside. Therefore, in the friction stir welding, it is favorable for the end surface of the shoulder 102 to be inserted slightly into the interior of the processing member 202.

In other words, in the friction stir welding, it is favorable to determine the distance between the end surface of the shoulder 102 and the upper surface of the processing member 202 in the Z-direction.

Also, there are also cases where the fluctuation of the mounting dimension of the tool 100 and/or the fluctuation of the thickness of the processing member 202 become large. Therefore, it is favorable to directly determine the distance between the end surface of the shoulder 102 and the upper surface of the processing member 202 in the Z-direction as much as possible.

Figure 13:
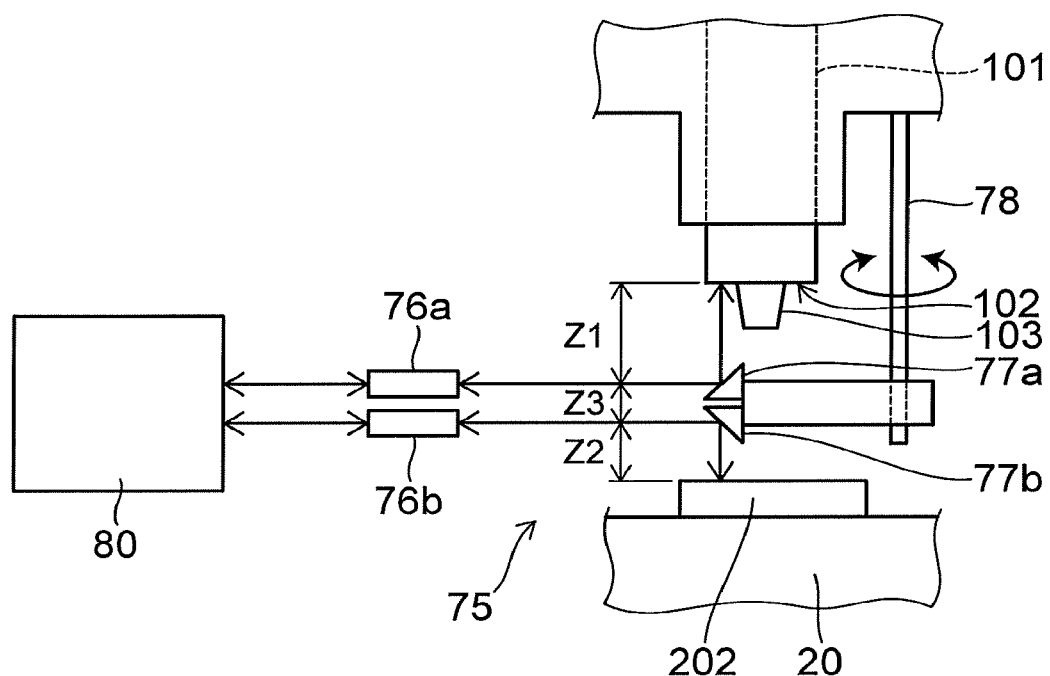
FIG. 13 is a schematic view for illustrating a measurement system.

FIG. 13 is a schematic view for illustrating a measurement system 75.

As shown in FIG. 13, a first detector 76a, a second detector 76b, a first movable reflector 77a, a second movable reflector 77b, and a driving part 78 are provided in the measurement system 75.

The first detector 76a and the second detector 76b can be, for example, laser measuring devices, laser range finders, etc. The first detector 76a is capable of irradiating laser light beam on the first movable reflector 77a and is capable of receiving the reflected laser light beam from the end part of the tool 100 (the end surface of the shoulder 102). The second detector 76b is capable of irradiating laser light beam on the second movable reflector 77b and is capable of receiving the reflected laser light beam from the processing member.

The first movable reflector 77a and the second movable reflector 77b can be, for example, prisms, reflection plates, etc. For example, the first movable reflector 77a and the second movable reflector 77b can be provided to be arranged in the Z-direction. The first movable reflector 77a is disposable between the processing member and the end part of the tool 100 on the processing member side. The second movable reflector 77b is disposable on the processing member side of the first movable reflector 77a.

The driving part 78 changes the positions of the first movable reflector 77a and the second movable reflector 77b. The driving part 78 can include, for example, a control motor such as a servo motor, etc.

In the case where a measurement of a distance described below is performed, the driving part 78 changes the positions of the first movable reflector 77a and the second movable reflector 77b so that the first movable reflector 77a and the second movable reflector 77b are positioned between the end surface of the shoulder 102 and the upper surface of the processing member 202.

When the measurement of the distance described below is ended, the driving part 78 changes the positions of the first movable reflector 77a and the second movable reflector 77b so that the first movable reflector 77a and the second movable reflector 77b are not positioned between the end surface of the shoulder 102 and the upper surface of the processing member 202.

The operations of the first detector 76a, the second detector 76b, and the driving part 78 can be performed by the controller 80. The calculation of the distance described below can be performed by the controller 80.

Operations of the measurement system 75 will now be described.

First, the controller 80 controls the driving part 78 and moves the first movable reflector 77a and the second movable reflector 77b so that the first movable reflector 77a and the second movable reflector 77b are positioned between the end surface of the shoulder 102 and the upper surface of the processing member 202.

Then, the first detector 76a irradiates laser light beam toward the first movable reflector 77a. The first movable reflector 77a reflects the incident laser light beam toward the end surface of the shoulder 102. The laser light beam that is incident on the end surface of the shoulder 102 is reflected toward the first movable reflector 77a, is further reflected by the first movable reflector 77a, and is incident on the first detector 76a. Based on the incident laser light beam, the first detector 76a determines the distance that the laser light beam traveled. In other words, the first detector 76a determines the total of the distance between the first detector 76a and the reflection position of the first movable reflector 77a and a distance Z1 between the reflection position of the first movable reflector 77a and the end surface of the shoulder 102.

Also, the second detector 76b irradiates laser light beam toward the second movable reflector 77b. The second movable reflector 77b reflects the incident laser light beam toward the upper surface of the processing member 202. The laser light beam that is incident on the upper surface of the processing member 202 is reflected toward the second movable reflector 77b, is further reflected by the second movable reflector 77b, and is incident on the second detector 76b. Based on the incident laser light beam, the second detector 76b determines the distance that the laser light beam traveled. In other words, the second detector 76b determines the total of the distance between the second detector 76b and the reflection position of the second movable reflector 77b and a distance Z2 between the reflection position of the second movable reflector 77b and the upper surface of the processing member 202.

Here, the distance between the first detector 76a and the reflection position of the first movable reflector 77a can be premeasured or preset. Therefore, the distance Z1 between the reflection position of the first movable reflector 77a and the end surface of the shoulder 102 can be determined from the difference between the distance measured by the first detector 76a and the distance between the first detector 76a and the reflection position of the first movable reflector 77a.

The distance between the second detector 76b and the reflection position of the second movable reflector 77b can be premeasured or preset. Therefore, the distance Z2 between the reflection position of the second movable reflector 77b and the upper surface of the processing member 202 can be determined from the difference between the distance measured by the second detector 76b and the distance between the second detector 76b and the reflection position of the second movable reflector 77b.

Also, a distance Z3 between the reflection position of the first movable reflector 77a and the reflection position of the second movable reflector 77b can be premeasured or preset.

Therefore, the distance between the end surface of the shoulder 102 and the upper surface of the processing member 202 in the Z-direction can be determined from the sum of the distance Z1, the distance Z2, and the distance Z3.

These calculations can be performed by the controller 80.

Then, the controller 80 controls the driving part 78 and causes the first movable reflector 77a and the second movable reflector 77b to move not to be positioned between the end surface of the shoulder 102 and the upper surface of the processing member 202.

According to the measurement system 75 according to the embodiment, it is possible to accurately determine the distance between the end surface of the shoulder 102 and the upper surface of the processing member 202 in the Z-direction.

Although the measurement system 75 that is provided in a friction stir welding equipment is illustrated above, the measurement system 75 is applicable to various processing devices.

In such a case, the first movable reflector 77a can be disposable between the workpiece and the end part of the tool on the workpiece side. The second movable reflector 77b can be disposable on the workpiece side of the first movable reflector 77a. The first detector 76a can be capable of irradiating laser light beam on the first movable reflector 77a and capable of receiving the reflected laser light beam from the end part of the tool. The second detector 76b can be capable of irradiating laser light beam on the second movable reflector 77b and capable of receiving the reflected laser light beam from the workpiece.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A friction stir welding equipment, comprising:
 a spindle unit capable of rotating a tool, the tool including a shank having a circular columnar configuration;
 a holder connectable to the tool via a radial bearing, the holder being capable of holding at least one of a side surface of a processing member or a rim of an upper surface of the processing member, the holder including:
  a plurality of claws capable of contacting the processing member,
  a housing having a tubular configuration, the shank being insertable through the housing,
  the radial bearing disposable between the shank and an interior wall of the housing,
  a base part having a tubular configuration and being provided in an interior of the housing, an end part of the plurality of claws on a side opposite to the side surface of the processing member being provided at the base part, and an urging part provided in the interior of the housing, the urging part being capable of urging the base part toward the side surface of the processing member; and a moving part capable of changing relative positions of the tool and the holder with respect to the processing member.

2. The friction stir welding equipment according to claim 1, wherein the radial bearing is a radial ball bearing.

3. The friction stir welding equipment according to claim 1, wherein the urging part is a compression coil spring.

4. The friction stir welding equipment according to claim 1, wherein the base part is provided movably through the interior of the housing in an axial direction.

5. The friction stir welding equipment according to claim 1, wherein the plurality of claws and the base part are formed as one body.

6. The friction stir welding equipment according to claim 1, wherein the spindle unit includes a spindle, and a hole is provided in an end surface of the spindle on a side of the holder, the shank being provided in the hole.

7. The friction stir welding equipment according to claim 1, wherein the spindle unit includes a spindle, and a collet chuck is provided at an end part of the spindle on a side of the holder, the collet chuck being capable of holding the shank.

8. The friction stir welding equipment according to claim 1, wherein the spindle unit includes a spindle, and the friction stir welding equipment further comprises a thrust bearing provided between an end surface of the housing and an end surface of the spindle.

9. The friction stir welding equipment according to claim 8, wherein the thrust bearing is a thrust ball bearing.

10. The friction stir welding equipment according to claim 1, further comprising:

a first imaging unit capable of imaging the processing member;

a second imaging unit capable of imaging an end part of the tool on the side surface of the processing member; and a movable alignment mark disposable between the first imaging unit and the second imaging unit.

11. The friction stir welding equipment according to claim 1, further comprising:

a first movable reflector disposable between the processing member and an end part of the tool on the side surface of the processing member;

a second movable reflector disposable on the side surface of the processing member of the first movable reflector;

a first detector capable of irradiating laser light beam on the first movable reflector and capable of receiving reflected laser light beam from the end part of the tool; and a second detector capable of irradiating laser light beam on the second movable reflector and capable of receiving reflected laser light beam from the processing member.

* * * * *